Nov. 6, 1923.
W. H. KUTINA
1,473,435
AUTOMOBILE WHEEL
Filed May 1, 1922
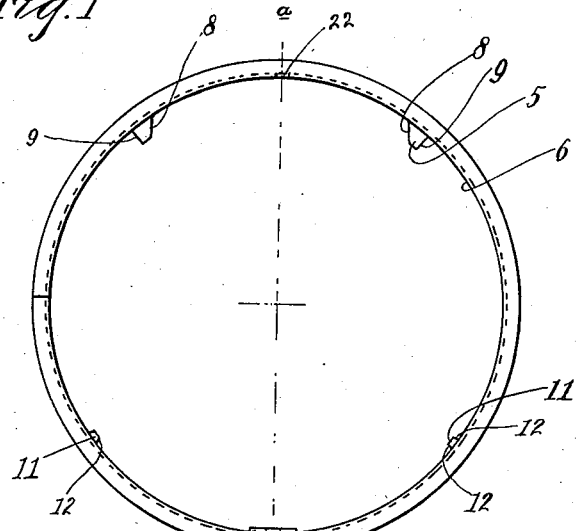
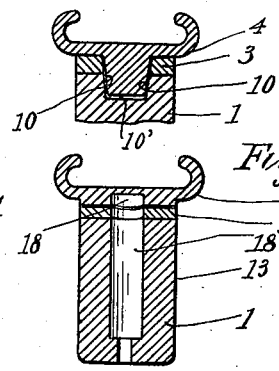
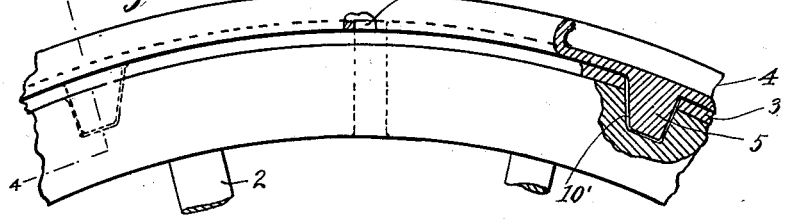
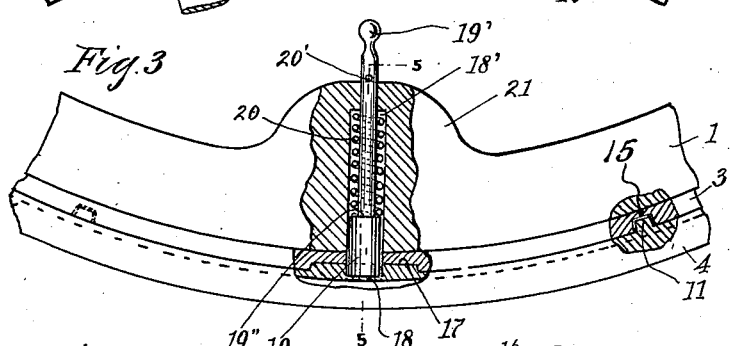
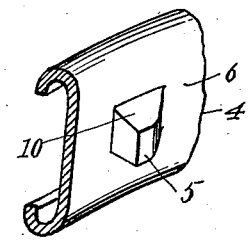
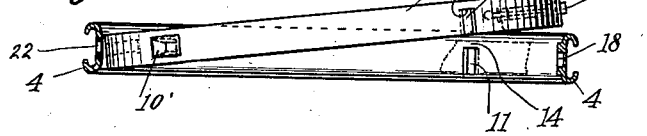
Inventor,
William H. Kutina
by H. S. Johnson
his Attorney Patented Nov. 6, 1923.

1,473,435

UNITED STATES PATENT OFFICE.

WILLIAM H. KUTINA, OF EWEN, MICHIGAN.

AUTOMOBILE WHEEL.

Application filed May 1, 1922. Serial No. 557,591.

*To all whom it may concern:*

Be it known that I, WILLIAM H. KUTINA, a citizen of the United States, residing at Ewen, in the county of Ontonagon and State of Michigan, have invented certain new and useful Improvements in Automobile Wheels, of which the following is a specification.

This invention relates to vehicle wheels, and more particularly to demountable rims for automobile wheels, an object of the invention being the provision of a novel construction whereby the rim may be readily demounted without involving the removal of numerous bolts or loosening of fastening clips and the like.

A further object of the invention is to provide improved interlocking means between the wheel and the demountable rim for locking them together, said means being located wholly within the body lines of the wheel and the rim.

To this end the invention consists in the construction, combination and arrangement of parts hereinafter described and claimed.

In the accompanying drawings, forming part of this specification:

Figure 1, is a plan view of a tire rim forming part of my invention.

Fig. 2, is a side view of a segment of an automobile wheel and its demountable rim showing a part of the interlocking means.

Fig. 3, is a segmental side view, showing the hand operable mechanism for releasing the rim from the wheel.

Fig. 4, is a sectional view on line 4—4 of Fig. 2.

Fig. 5, is a sectional view on line 5—5 of Fig. 3.

Fig. 6, is a fragmentary perspective view of a section of the demountable rim, showing one of the steady lugs thereon, and Fig. 7, is a sectional view of the tire rim showing the manner of placing the wheel in proper position within the rim.

In the drawings, 1 designates the felloe of an automobile wheel, 2 the spokes and 3 the felly band thereof. Fitting removably around the band is the demountable split steel rim 4, the rim here shown being adapted to receive an ordinary inflatable clincher tire, it being understood however, that any conventional form of tire may be substituted.

The rim is formed with a pair of spaced steady lugs 5 which are here shown positioned symmetrically about an imaginary line as a—a intersecting the center of rotation of the rim, said lugs extending from the inner face 6 thereof. Adjacent sides 8 of the lugs preferably diverge toward the center of the rim to thereby provide draft or taper, with respect to the center line a—a while the remote sides 9 thereof are preferably radially disposed for purposes hereinafter explained. The lugs are preferably formed with flat outer sides 10 which converge toward the center of the rim, as shown in Figure 4 of the drawing. Thus, the lugs are appreciably smaller at the outer extremity than at the base, and present two oppositely disposed radial shoulders formed by the sides 9. These lugs fit into the sockets or cavities 10' in the periphery of the wheel, said sockets extending through the felly band into the felloe of the wheel to secure greater bearing surface for the lugs.

Positioned symmetrically about the aforesaid imaginary line, opposite the lugs, are the elongated cleats or stops 11, said cleats extending parallel with the axis of rotation of the rim, on the inner face 6 thereof.

The cleats are preferably formed with radially disposed sides 12, and are of lesser thickness than the felly band 3, and are so positioned on the rim as to have their ends run true therewith.

The periphery of the felly band is formed with notches or grooves 15 designed to receive the cleats, said notches having end walls 16 which engage with the ends of the cleats, when the wheel is in proper position. Midway between the cleats, the inner face 6 of the rim is formed with a flat raised reinforcing portion 17 having a central circular recess 18 therein. The felly band is accordingly cut away to receive said reinforcing portion, as shown in Figure 3, and is perforated by an aperture in register with the recess 18. Registering with the aperture and extending radially into the felloe is the elongated chamber 18' wherein slidably fits the lock bar 19, the upper portion thereof being of reduced diameter and extending through the felloe to form a handle 19'. A suitable extensile spring 20 in said chamber, surrounds the lock bar and engages under stress the shoulder 19'' of the latter. A stop pin 20' extending through the lock bar limits the outward sliding movement thereof.

By reinforcing the rim as described, I secure ample bearing in the recess for the lock bar, thereby rendering the device strong and safe against accidental partial withdrawal of the bar.

The device is constructed to enable the lugs, cleats and the reinforcing raised portion to be easily welded to an ordinary tire rim while an ordinary felly band may easily and cheaply be prepared to fit into the rim.

While I have shown an extension 21 on the felloe, this is not essential, as the lock bar may be made to fit an ordinary wheel. In the process of placing the rim on the wheel, the lock bar is manually pulled out against the tension of the spring and the lugs initially inserted into the sockets 10' by slightly tilting the rim, as indicated in Figure 7. The cleats are then entered into the grooves of the wheel to bring them to rest against the end walls of the grooves, whereby the planes of the wheel and rim are rendered coincident. The lock bar is then released to allow it to enter the recess 18.

By diverging the walls 8 of the lugs, draft or in other words, taper is provided to facilitate entry of the lugs into the sockets. By having the walls 9 and 12 respectively of the lugs and cleats radial, the propelling thrusts communicated by the driven wheel to the rim are applied squarely to the latter, both in a reverse or forward movement.

An opening 22 midway between the lugs receives the usual tire valve (not shown) the felloe being correspondingly perforated to permit the valve to extend therethrough.

The lugs 5 steady or stabilize the rim laterally to hold it true, while the lock bar likewise steadies the rim on the opposite side of the wheel.

I claim:

The combination with a wheel having a circumferential face formed by a felly band surrounding the body thereof, said wheel having circumferentially spaced peripheral sockets in half of its circumferential face, said sockets extending through said felly band and into the body of the wheel, and circumferentially spaced transversely disposed grooves wholly in the felly band and located opposite said sockets in the other half of its circumferential face, said grooves being open at one end, the openings thereof facing laterally; of a demountable rim adapted to be placed in close fitting relation around said wheel, releasable locking means for locking said rim to said wheel when said rim is in close fitting relation therewith, said locking means being located midway between said grooves, projections carried by said rim formed and positioned to adapt them to be entered respectively into the openings of said grooves and occupy the latter, and lugs carried by the rim shaped and located to be initially entered respectively partially into said sockets to bring said projections into register with said groove openings, and be then completely entered into said sockets, concurrently with the entry of said projections into said grooves, to extend through and beyond said felly band into the body of the wheel.

In testimony whereof I affix my signature.

WILLIAM H. KUTINA.